(12) United States Patent
Seo et al.

(10) Patent No.: US 7,218,469 B2
(45) Date of Patent: May 15, 2007

(54) REEL DRIVING APPARATUS AND MAGNETIC RECORDING AND REPRODUCING DEVICE HAVING THE SAME

(75) Inventors: Jae-kab Seo, Suwon-si (KR);
Jun-young Kim, Suwon-si (KR);
Bong-joo Kim, Suwon-si (KR);
Young-ho Cho, Suwon-si (KR);
Chung-hum Baik, Suwon-si (KR);
Myoung-joon Kim, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 204 days.

(21) Appl. No.: 11/110,816

(22) Filed: Apr. 21, 2005

(65) Prior Publication Data
US 2006/0164745 A1    Jul. 27, 2006

(30) Foreign Application Priority Data
Aug. 12, 2004    (KR)    ...................... 10-2004-0063606

(51) Int. Cl.
*G11B 15/46*    (2006.01)
(52) U.S. Cl. .................................................. 360/73.01
(58) Field of Classification Search ............. 360/73.01, 360/69, 55, 96.2, 96.1, 84, 74.1; 242/355.1, 242/356.3; 318/293; 355/41
See application file for complete search history.

(56) References Cited

U.S. PATENT DOCUMENTS

| 3,911,490 | A | * | 10/1975 | Kostin et al. .................. 360/84 |
| 4,057,346 | A | * | 11/1977 | Ellingham et al. ............ 355/41 |
| 4,594,625 | A | * | 6/1986 | Kurafuzi ..................... 360/96.3 |
| 5,511,737 | A | * | 4/1996 | Kang et al. ............... 242/355.1 |
| 5,669,568 | A | * | 9/1997 | Kang et al. ............... 242/355.1 |
| 5,731,672 | A | * | 3/1998 | Miyaguchi .................. 318/293 |
| 6,198,595 | B1 | * | 3/2001 | Park et al. .................. 360/96.2 |
| 6,683,742 | B2 | * | 1/2004 | Higuchi ..................... 360/74.1 |
| 6,913,220 | B2 | * | 7/2005 | Hayashi et al. .......... 242/356.3 |

FOREIGN PATENT DOCUMENTS

| GB | 2307777 | 6/1997 |
| KR | 1993-0004976 | 3/1993 |

* cited by examiner

*Primary Examiner*—Fred F. Tzeng
(74) *Attorney, Agent, or Firm*—Roylance, Abrams, Berdo & Goodman, L.L.P.

(57) ABSTRACT

A reel driving apparatus and a magnetic recording and reproducing device including the reel driving apparatus, where the reel driving apparatus includes: a driver including at least a portion protruding under a deck chassis; a power transmitting unit transmitting a power to the driver; a power changing unit gearing with the driver and selectively transmitting a power to a plurality of reel tables according to a direction along which the driver rotates; and a fixing unit supporting the driver.

21 Claims, 6 Drawing Sheets

REEL DRIVING APPARATUS AND MAGNETIC RECORDING AND REPRODUCING DEVICE HAVING THE SAME

CROSS-REFERENCE TO RELATED APPLICATIONS

This application claims benefit under 35 U.S.C. § 119(a) of Korean Patent Application No. 2004-63606, filed Aug. 12, 2004, the entire disclosure of which is hereby incorporated by reference.

BACKGROUND OF THE INVENTION

1. Field of the Invention

The present invention relates to magnetic recording and reproducing devices such as video tape recorders (VTR) and camcorders. More particularly, the present invention relates to a reel driving apparatus for rotating a reel table on which reels of a tape cassette are placed and a magnetic recording and reproducing device having the same.

2. Description of the Related Art

In general, a magnetic recording and reproducing apparatus such as a VTR and a camcorder includes a reel driving apparatus for rotating reels of a tape cassette to supply a magnetic tape to and withdraw the magnetic tape from a head drum. Such a reel driving apparatus selectively transmits power of a capstan motor to a supplying and winding reel table on which supplying and winding reels of a tape cassette are placed to facilitate travel of a magnetic tape along a predetermined path forward or backward.

FIGS. 1 and 2 are schematic views of a magnetic recording and reproducing device including a conventional reel driving apparatus.

The magnetic recording and reproducing device includes a head drum 11, supplying and winding reel assemblies 12 and 13, and a capstan motor 17. The head drum 11 records an image and sound information on and/or reproduces an image and sound information from a magnetic tape and is installed on an upper surface of a deck chassis 10. The supplying and winding reel assemblies 12 and 13 are spaced apart from each other on a lower portion of the upper surface of the deck chassis 10 and respectively include supplying and winding reel tables 12a and 13a on which supplying and winding reels of a tape cassette are placed. The capstan motor 17 is installed in the vicinity of the head drum 11, transmits power to the supplying and winding reel assemblies 12 and 13, and includes a capstan shaft 17a for transferring the magnetic tape together with a pinch roller 18.

A reel driving apparatus 1 is installed between the supplying and winding reel assemblies 12 and 13 and the capstan motor 17 to transmit the power of the capstan motor 17 to the supplying and winding reel assemblies 12 and 13.

The reel driving apparatus 1 includes a capstan gear 19 gearing with a motor gear 17b of the capstan motor 17, a driving gear 14 including a driven pulley 14a coupled to a driving pulley 19a of the capstan gear 19 by a power transmitting belt 16, and an idle gear 15 selectively gearing with a supplying real gear 12b of the supplying reel assembly 12 or a winding reel gear 13b of the winding reel assembly 13 according to a direction along which the driving gear 14 rotates.

The power of the capstan motor 17 is transmitted through the capstan gear 19 and the power transmitting belt 16 to the driving gear 14. The power transmitted to the driving gear 14 is transmitted to the supplying reel gear 12b or the winding reel gear 13b through the idle gear 15 revolving around a driving shaft 21 of the driving gear 14 according to the direction along which the driving gear 14 rotates.

However, in the reel driving apparatus 1 having the above-described structure, the power transmitting belt 16 is installed on the upper surface of the deck chassis 10. Thus, a space for installing the other deck components such as a pole base assembly (not shown), a pinch roller assembly (not shown), or the like disposed on the upper surface of the deck chassis 10 is reduced. As a result, the structure of the deck chassis 10 becomes complicated, and it is difficult to make the deck chassis 10 compact.

To solve this problem, as shown in FIG. 3, there is suggested a reel driving apparatus 1' including a motor gear 17b' of a capstan motor 17, a capstan gear 19' including a driving pulley 19a', a power transmitting belt 16', and a driven pulley 14a' of a driving gear 14' that are disposed on a lower surface of the deck chassis 10.

In the reel driving apparatus 1', a plurality of components are disposed on the lower surface of the deck chassis 10 to increase a space for installing the other components disposed on the upper surface of the deck chassis 10. However, the driving gear 14' protrudes upward from the driving shaft 21 fixed to a stationary bracket 20 depressed from the deck chassis 10 downward by a thickness of the driven pulley 14a'. Thus, when the reel driving apparatus 1' is assembled, it is difficult to insert the power transmitting belt 16' between the driving pulley 19a' and the driven pulley 14a'.

In other words, the power transmitting belt 16' is assembled as follows. The driving gear 14' is fixed to the driving shaft 21 of the stationary bracket 20 on the upper surface of the deck chassis 10. Next, an end of the power transmitting belt 16' is inserted into the driven pulley 14a' of the driving gear 14', and the other end of the power transmitting belt 16' is pushed under the deck chassis 10 through a space 24 between the deck chassis 10 and the stationary bracket 20. Thereafter, the deck chassis 10 is turned upside-down to insert the other end of the power transmitting belt 16' into the driving pulley 19a' of the capstan gear 19'. However, when the deck chassis 10 is turned upside-down to insert the other end of the power transmitting belt 16' into the driving pulley 19a' of the capstan gear 19', the end of the power transmitting belt 16' may deviate from the driven pulley 14a' or the other end of the power transmitting belt 16' may come out of the space 24 between the deck chassis 10 and the stationary bracket 20. In this case, a worker must turn the deck chassis 10 upside-down to insert the end of the power transmitting belt 16' into the driven pulley 14a' or push the other end of the power transmitting belt 16' under the deck chassis 10 through the space 24 between the deck chassis 10 and the stationary bracket 20.

As described above, when the power transmitting belt 16' is assembled, the upper and lower surfaces of the deck chassis 10 must be turned upside-down. Also, when the end of the power transmitting belt 16' deviates from the driven pulley 14a' during turning of the deck chassis 10, the power transmitting belt 16' must be re-assembled from the start.

In addition, the reel driving apparatus 1 or 1' has a structure in which the idle gear 15 revolves according to the direction along which the driving gear 14 or 14' rotates on the upper surface of the deck chassis 10. Thus, the idle gear 15 may contact or interfere with the upper surface of the deck chassis 10 due to a manufacturing tolerance or the like. In a case where the idle gear 15 contacts or interferes with the upper surface of the deck chassis 10, noise is made between the idle gear 15 and the deck chassis 10. Also, the power of the capstan motor 17 may not be transmitted to the supplying reel gear 12b of the supplying reel assembly 12 or the winding reel gear 13b of the winding reel assembly 13.

SUMMARY OF THE INVENTION

According to various non-limiting aspects of exemplary embodiments of the invention, at least some of the above-noted problem and/or disadvantages of conventional systems are addressed by providing a reel driving apparatus which may allow easy assembly and further driving stability, and a magnetic recording and reproducing device accordingly.

According to an aspect of the invention, there is provided a reel driving apparatus of a magnetic recording and reproducing device including: a driver including at least a portion protruding under a deck chassis; a power transmitting unit for transmitting power to the driver; a power changing unit gearing with the driver and selectively transmitting power to a plurality of reel tables according to a direction along which the driver rotates; and a fixing unit for supporting the driver.

According to another aspect of the invention, the driver may include a driving gear comprising a driven pulley coupled to the power transmitting unit and a first gear gearing with the power changing unit.

According to another aspect of the invention, the fixing unit may protrude above the deck chassis by a predetermined distance and support the driven pulley so that at least a portion of the driven pulley protrudes under the deck chassis. The fixing unit may include a stationary bracket fixing a driving shaft supporting the driver.

According to another aspect of the invention, the power transmitting unit may include a capstan gear coupled to a capstan motor and comprising a driving pulley; and a power transmitting belt for coupling the driving pulley to the driven pulley.

According to another aspect of the invention, the power changing unit may include an idle gear; and an idle plate supporting the idle gear so as to gear with the first gear and to revolve around the driving shaft. According to another aspect of the invention, the power changing unit may further include an escape opening so as to prevent noise or operation error.

According to yet another aspect of the invention, there is provided a magnetic recording and reproducing device including a plurality of reel tables which are installed on a deck chassis and on which reels of a tape cassette are placed; a capstan motor installed on the deck chassis; a driver including at least a portion protruding under the deck chassis and installed between the plurality of reel tables; a power transmitting unit disposed on a lower surface of the deck chassis and transmitting a power of the capstan motor to the driver; a power changing unit operating together with the driver and selectively transmitting power to one of the plurality of reel tables according to a direction along which the driver rotates; and a fixing unit for supporting the driver so that the driver rotates.

According to another aspect of the invention, the driver may include a driving gear including a driven pulley coupled to the power transmitting unit and a first gear gearing with the power changing unit. According to another aspect of the invention, the fixing unit may protrude above the deck chassis by a predetermined distance and include a stationary bracket for fixing a driving shaft supporting the driven pulley so that at least a portion of the driven pulley protrudes under the deck chassis.

According to another aspect of the invention, the power transmitting unit may include a capstan gear coupled to a capstan motor and comprising a driving pulley; and a power transmitting belt coupling the driving pulley to the driven pulley.

According to another aspect of the invention, the power changing unit may include an idle gear; an idle plate supporting the idle gear so as to gear with the first gear and to revolve around the driving shaft; and an escape opening formed on the deck chassis to a size corresponding to an operation trajectory of the idle gear.

BRIEF DESCRIPTION OF THE DRAWINGS

The above aspects and features of the exemplary embodiments of the present invention will be more apparent by describing certain features of these embodiments with reference to the accompanying drawings, in which.

Throughout the drawings, the same drawing reference numerals will be understood to refer to the same elements, features, and structures.

DETAILED DESCRIPTION OF EXEMPLARLY EMBODIMENTS

Hereinafter, a reel driving apparatus and a magnetic recording and reproducing device including the reel driving apparatus, according to an exemplary embodiment of the present invention will be described in detail with reference to the attached drawings.

Figure 4:
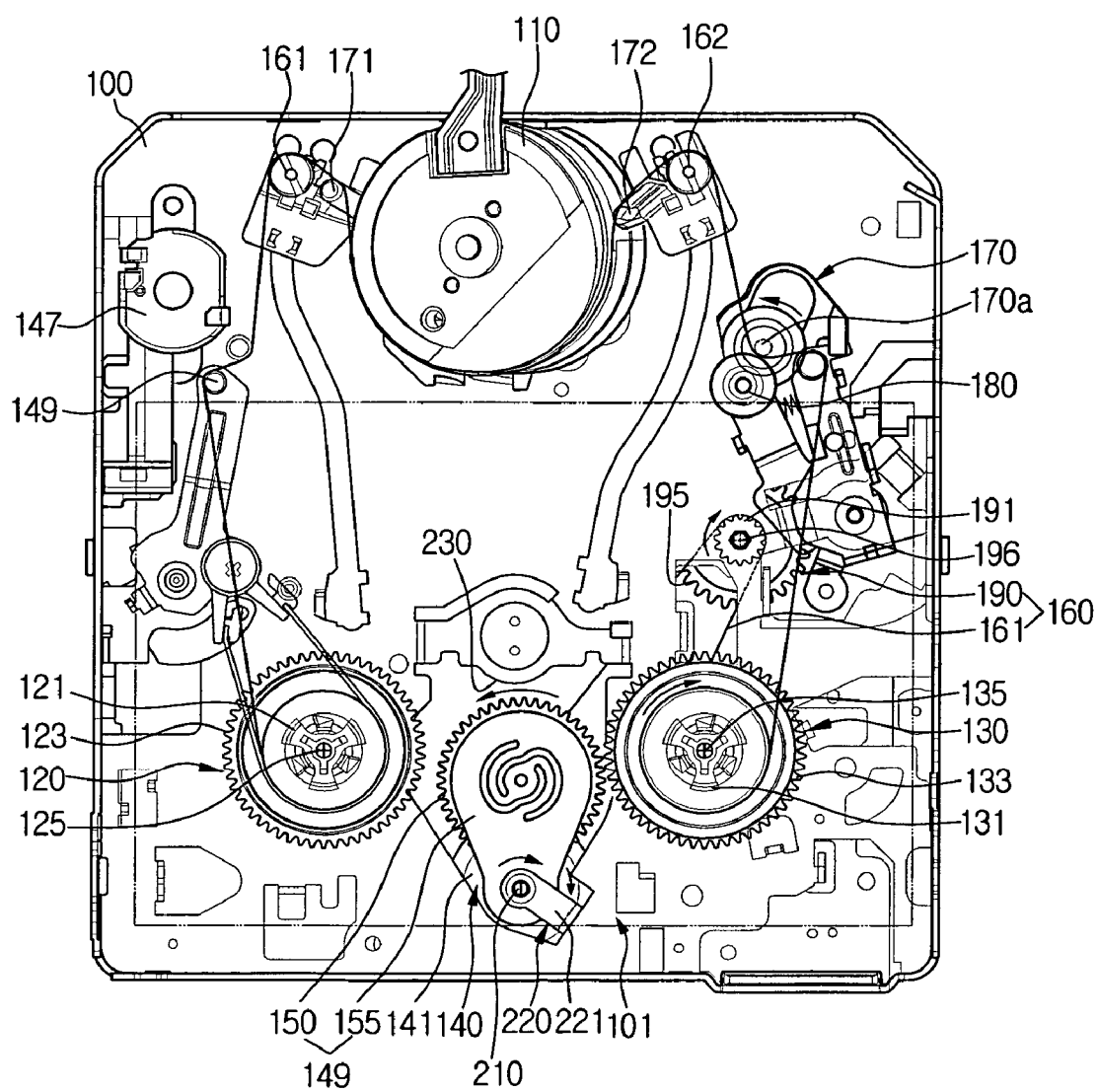
FIG. 4 is a schematic plan view of an upper surface of a magnetic recording and reproducing device including a reel driving apparatus according to an exemplary embodiment of the present invention.
Figure 5:
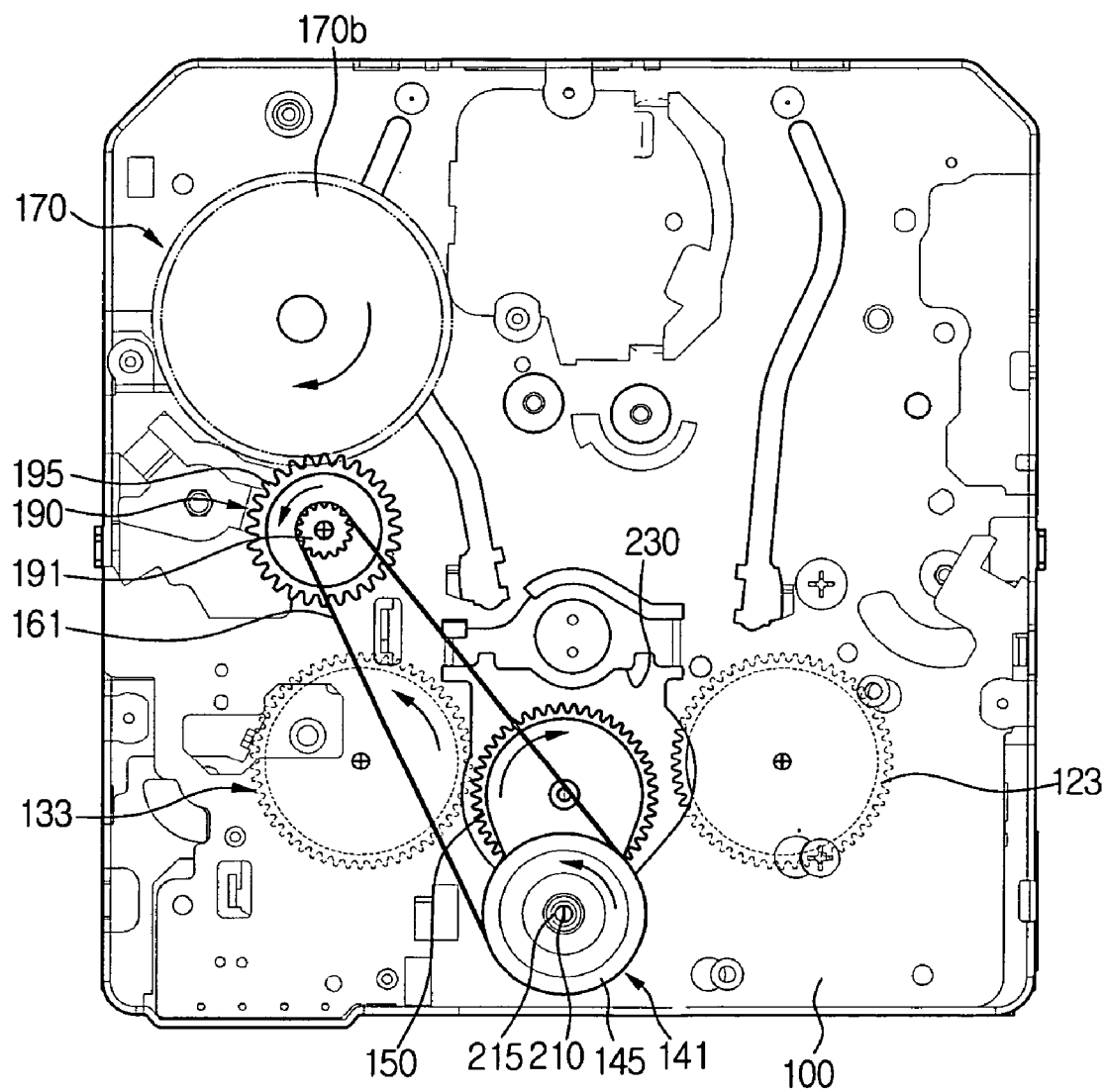
FIG. 5 is a schematic plan view of a lower surface of the magnetic recording and reproducing device shown in FIG. 4.
Figure 6:
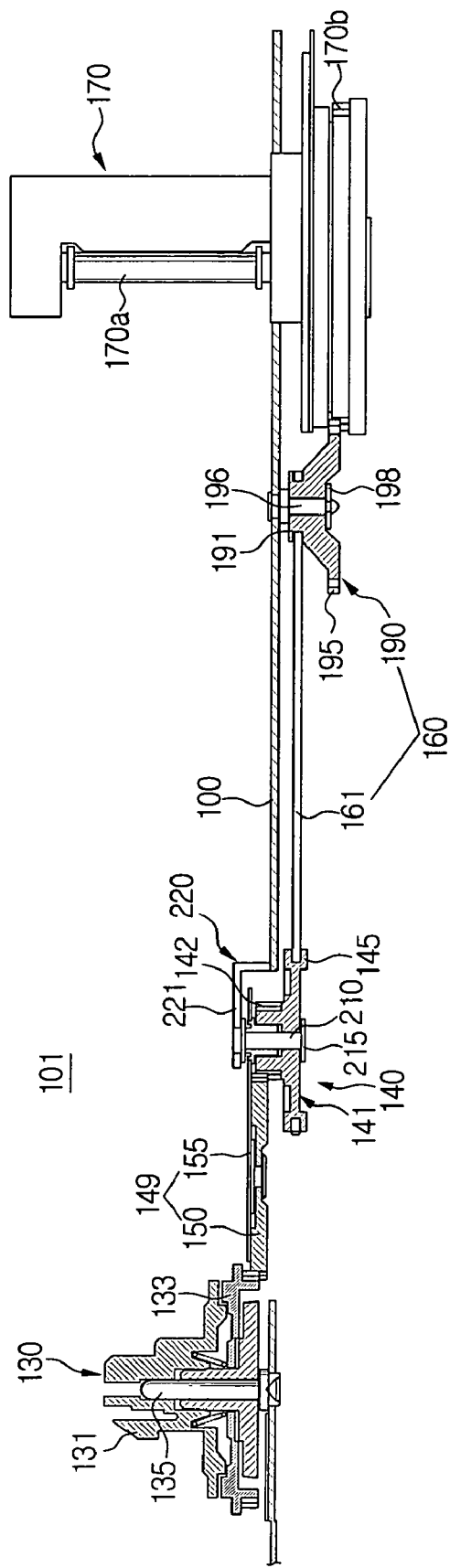
FIG. 6 is a schematic cross-sectional view of the magnetic recording and reproducing device shown in FIG. 4.

FIGS. 4 through 6 schematically illustrate a magnetic recording and reproducing device including a reel driving apparatus according to an exemplary embodiment of the present invention.

The magnetic recording and reproducing device includes a head drum 110, supplying and winding reel assemblies 120 and 130, and a capstan motor 170. The head drum 110 records an image and sound information on and/or reproduces an image and sound information from a magnetic tape and is installed on an upper portion of an upper surface of a deck chassis 100. The supplying and winding reel assemblies 120 and 130 are spaced apart from each other on a lower portion of the upper surface of the deck chassis 100.

The supplying and winding reel assemblies 120 and 130 respectively include supplying and winding reel tables 121 and 131 on which supplying and winding reels of a tape cassette are placed and supplying and winding reel gears 123 and 133 rotatably supported by first and second shafts 125 and 135 fixed to the deck chassis 100 so as to rotate the supplying and winding reel tables 121 and 131. The capstan motor 170 includes a capstan shaft 170a protruding toward the upper surface of the deck chassis 100 and pressing and transferring the magnetic tape together with a pinch roller 180, and a motor gear 170b (refer to FIGS. 5 and 6) installed on a lower surface of the deck chassis 100 and transmitting power to the supplying and winding reel assemblies 120 and 130 through a power transmitting unit 160 of a reel driving apparatus that will be described later.

The reel driving apparatus 101 is installed between the supplying and winding reel assemblies 120 and 130 and the capstan motor 170 to transmit the power of the capstan motor 170 to the supplying and winding reel assemblies 120 and 130.

The reel driving apparatus 101 includes a driver 140, the power transmitting unit 160, a power changing unit 149, and a fixing unit 220.

The driver 140 includes a driving gear 141 installed between the supplying and winding reel assemblies 120 and 130. As shown in FIG. 6, the driving gear 141 includes a large caliber driven pulley 145 disposed at a lower portion of the driving gear 141 and a small caliber first gear 142 disposed at an upper portion of the driving gear 141. The driving gear 141 is rotatably supported by a drive shaft 210 fixed to a stationary bracket 221 of the fixing unit 220 via a first washer 215 so that the driven pulley 145 protrudes under the lower surface of the deck chassis 100.

The power transmitting unit 160 is disposed on the lower surface of the deck chassis 100 and transmits a power of the motor gear 170b of the capstan motor 170 to the driven pulley 145 of the driving gear 141 of the driver 140. The power transmitting unit 160 includes a capstan gear 190 including a second gear 195 gearing with the motor gear 170b of the capstan motor 170 and a driving pulley 191, and a power transmitting belt 161 coupling the driving pulley 191 of the capstan gear 190 to the driven pulley 145 of the driving gear 141. The capstan gear 190 is rotatably supported by a third shaft 196 fixed to the deck chassis 100 via a second washer 198 in the vicinity of the capstan motor 170.

The power changing unit 149 includes an idle gear 150, an idle plate 155 supporting the idle gear 150 so that the idle gear 150 gears with the first gear 142 of the driving gear 141 and revolves on the drive shaft 210, and an escape opening 230.

The idle plate 155 revolves the idle gear 150 clockwise or counterclockwise according to a direction along which the driving gear 141 rotates to selectively couple the idle gear 150 to the supplying reel gear 123 of the supplying reel assembly 120 or the winding reel gear 133 of the winding reel assembly 130.

The escape opening 230 is formed on the deck chassis 100 in the vicinity of the idle gear 150 so as to prevent noise or operation error from occurring due to a contact between the idle gear 150 and the deck chassis 100 during the clockwise or counterclockwise rotation of the idle gear 150. The escape opening 230 is formed by incising an area corresponding to an operation trajectory of the idle gear 150.

The fixing unit 220 includes the stationary bracket 221 in the shape of an "L" for fixing the drive shaft 210 protruding above the upper surface of the deck chassis 100 and rotatably supporting the driving gear 141, so that the drive shaft 210 protrudes downward. A height of the stationary bracket 221 protruding above the upper surface of the deck chassis 100 is set to be the same as that of the driven pulley 145 of the driving gear 141 protruding under the lower surface of the deck chassis 100 when the driving gear 141 is installed at the driving shaft 210.

Figure 1:
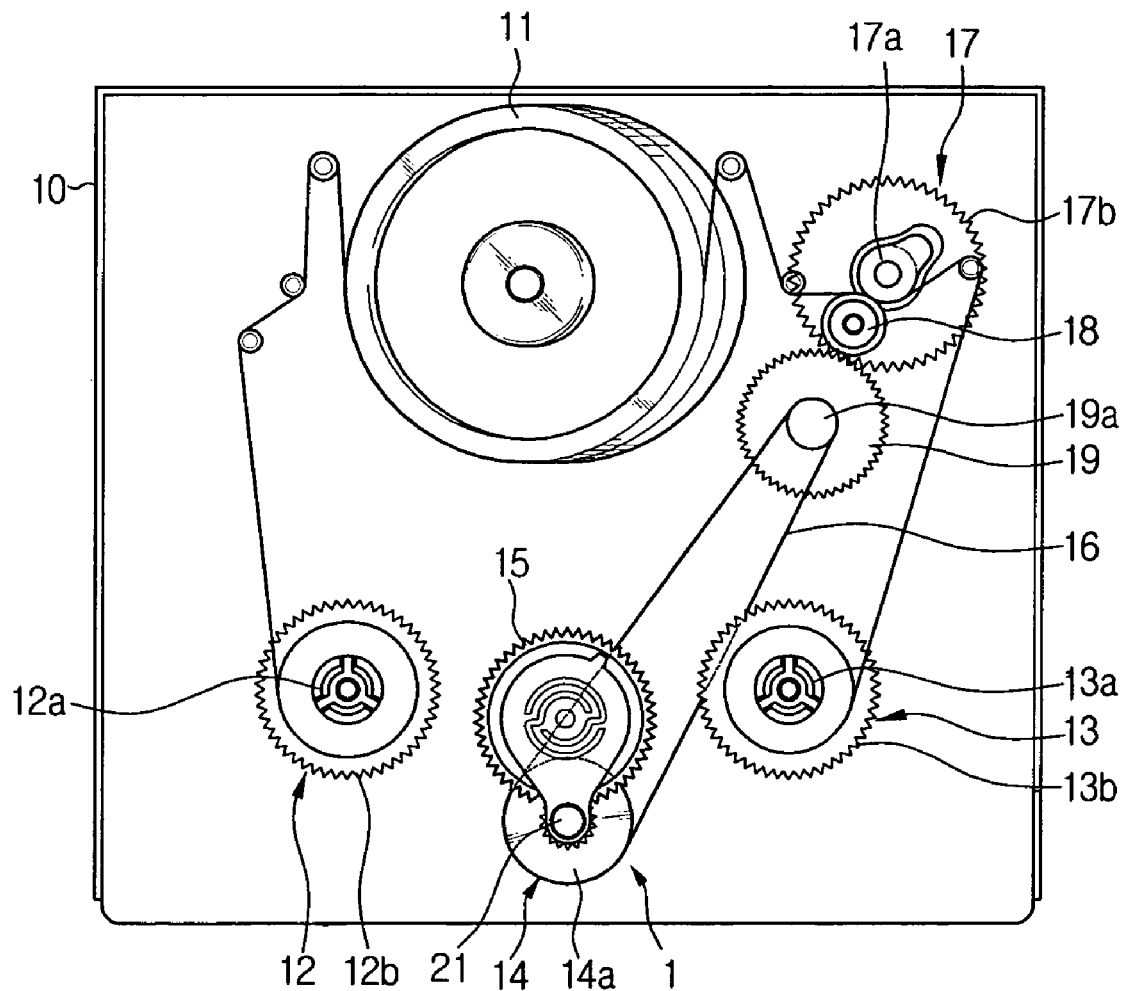
FIG. 1 is a schematic plan view of an upper surface of a magnetic recording and reproducing device including a conventional reel driving apparatus.
Figure 2:
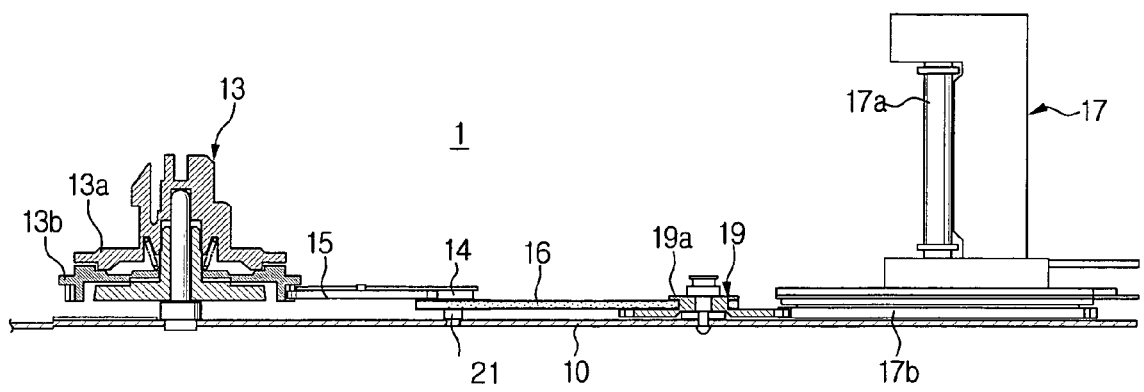
FIG. 2 is a schematic cross-sectional view of the magnetic recording and reproducing device shown in FIG. 1.
Figure 3:
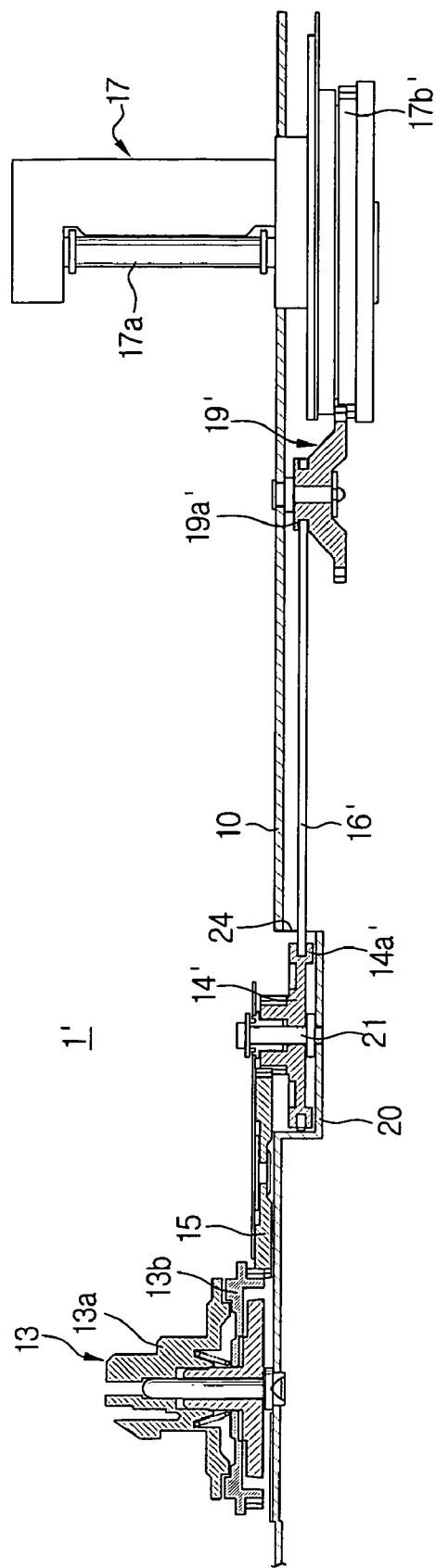
FIG. 3 is a schematic view of a magnetic recording and reproducing device including another conventional reel driving apparatus.

Thus, unlike the driving gear 14' of the conventional reel driving apparatus 1' described with reference to FIG. 3, the driving gear 141 of the driver 140 is put onto the driving shaft 210 fixed to the stationary bracket 221 and fixed by the first washer 215 when the lower surface of the deck chassis 100 is turned upward. Thus, the driving gear 141 can be simply assembled. As a result, after the driving gear 141 is assembled with the driving shaft 210, the power transmitting belt 161 may be simply inserted between the driven pulley 145 of the driving gear 141 and the driving pulley 191 of the capstan gear 190 without turning the deck chassis 100 upside-down.

The operation of the magnetic recording and reproducing device including the reel driving apparatus 101 having the above-described structure will now be described in detail with reference to FIGS. 4 through 6.

A play mode or a fast forward mode in which a magnetic tape winds around winding reels of a tape cassette will now be described.

When supplying and winding reels of a tape cassette are placed on the supplying and winding reel tables 121 and 131, and then a loading motor 147 is driven, a magnetic tape is withdrawn toward the head drum 110 by a tension pole 149, first and second guide rollers 161 and 162, and first and second slant poles 171 and 172 operating by a well-known driving apparatus (not shown) and is pressed against a capstan shaft 170a by the pinch roller 180.

In this state, the capstan motor 170 is driven toward one direction, for example, counterclockwise (clockwise as shown in FIG. 5). As a result, the power of the capstan motor 170 is transmitted to the driving gear 141 through the motor gear 170b, the capstan gear 190, and the power transmitting belt 161, and the driving gear 141 rotates clockwise.

As the driving gear 141 rotates clockwise, the idle gear 150 supported by the idle plate 155 so as to gear with the first gear 142 of the driving gear 141 rotates counterclockwise to revolve clockwise on the driving shaft 210.

As a result, as shown in FIG. 4, the idle gear 150 gears with the winding reel gear 133 of the winding reel assembly 130, and the winding reel gear 133 and the winding reel table 131 coupled to the winding reel gear 133 rotate clockwise.

Therefore, the magnetic tape is wounded from supplying reels of the tape cassette toward winding reels of the tape cassette while pressed between the pinch roller 180 and the capstan shaft 170a due to the power of the capstan motor 170.

A rewind mode or review mode will now be described.

As in the play mode or the fast forward mode, after the magnetic tape is withdrawn toward the head drum 110 and pressed against the capstan shaft 170a, the capstan motor 170 is driven toward another direction, that is, clockwise (counterclockwise as shown in FIG. 5). Thus, the driving gear 141 rotates counterclockwise due to the power of the capstan motor 170, and the idle gear 150 supported so as to gear with the first gear 142 of the driving gear 141 by the idle plate 155 rotates clockwise to revolve on the driving shaft 210 counterclockwise.

As a result, the idle gear 150 gears with the supplying reel gear 123 of the supplying reel assembly 120, and the supplying reel gear 123 and the supplying reel table 121 coupled to the supplying reel gear 123 rotate counterclockwise.

Thus, the magnetic tape is wounded from the winding reels of the tape cassette toward the supplying reels while pressed between the pinch roller 180 and the capstan shaft 170a.

As described above, in a reel driving apparatus and a magnetic recording and reproducing device including the reel driving apparatus, according to an exemplary embodiment of the present invention, a fixing unit can be included to fix a driver onto a deck chassis when a lower surface of the deck chassis is turned upward. Thus, after the driver is assembled, a power transmitting belt can be assembled without turning the deck chassis upside-down. As a result, the power transmitting belt may be easily assembled, and productivity may be improved.

Also, an escape opening may be formed on the deck chassis in the vicinity of the idle gear so as to prevent noise form occurring due to a contact of the idle gear with the deck chassis or an interference of the idle gear with the deck chassis during the operation of the idle gear. In addition, the escape opening can prevent the idle gear form being uncoupled from supplying and winding reel gears of supplying and winding reel assemblies.

The foregoing embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A reel driving apparatus of a magnetic recording and reproducing device, the reel driving apparatus comprising:
    a driver comprising at least a portion protruding under a deck chassis;
    a power transmitting unit transmitting a power to the driver;
    a power changing unit gearing with the driver and transmitting a power to at least one reel table; and
    a fixing unit supporting the driver.

2. The reel driving apparatus of claim 1, wherein the driver comprises a driving gear comprising a driven pulley coupled to the power transmitting unit and a first gear gearing with the power changing unit.

3. The reel driving apparatus of claim 2, wherein the fixing unit protrudes above the deck chassis by a predetermined distance and supports the driven pulley, wherein the portion protruding under the deck chassis comprises at least a portion of the driven pulley.

4. The reel driving apparatus of claim 3, wherein the fixing unit comprises a stationary bracket for fixing a driving shaft supporting the driver.

5. The reel driving apparatus of claim 4, wherein the power transmitting unit comprises:
    a capstan gear coupled to a capstan motor and comprising a driving pulley; and
    a power transmitting belt for coupling the driving pulley to the driven pulley.

6. The reel driving apparatus of claim 5, wherein the power changing unit comprises:
    an idle gear; and
    an idle plate supporting the idle gear to gear with the first gear and to revolve around the driving shaft.

7. The reel driving apparatus of claim 6, wherein the power changing unit further comprises an opening.

8. The reel driving apparatus of claim 7, wherein the opening is in the deck chassis, and a size of the opening corresponds to an operation trajectory of the idle gear.

9. The reel driving apparatus of claim 7, wherein the opening is configured to prevent at least one of noise and operation error.

10. The reel driving apparatus of claim 1, wherein the driver selectively transmits the power to a plurality of reel tables according to a direction along which the driver rotates.

11. A magnetic recording and reproducing device comprising:
    a deck chassis;
    at least one reel table configured on the deck chassis;
    a capstan motor configured on the deck chassis;
    a driver configured on the deck chassis and comprising at least a portion protruding under the deck chassis;
    a power transmitting unit disposed on a lower surface of the deck chassis and transmitting a power of the capstan motor to the driver;
    a power changing unit operating together with the driver and transmitting a power to the at least one reel table; and
    a fixing unit supporting the driver so that the driver rotates.

12. The magnetic recording and reproducing device of claim 11, wherein the driver comprises a driving gear comprising a driven pulley coupled to the power transmitting unit and a first gear gearing with the power changing unit.

13. The magnetic recording and reproducing device of claim 12, wherein the fixing unit protrudes above the deck chassis by a predetermined distance and comprises a stationary bracket fixing a driving shaft supporting the driven pulley, wherein the portion protruding under the deck chassis comprises at least a portion of the driven pulley.

14. The magnetic recording and reproducing device of claim 13, wherein the power transmitting unit comprises:
    a capstan gear coupled to a capstan motor and comprising a driving pulley; and
    a power transmitting belt coupling the driving pulley to the driven pulley.

15. The magnetic recording and reproducing device of claim 14, wherein the power changing unit comprises:
    an idle gear; and
    an idle plate supporting the idle gear so as to gear with the first gear and to revolve around the driving shaft.

16. The magnetic recording and reproducing device of claim 15, further comprising an opening in the deck chassis.

17. The magnetic recording and reproducing device of claim 16, wherein a size of the opening corresponds to an operation trajectory of the idle gear.

18. The magnetic recording and reproducing device of claim 9, comprising at least two reel tables.

19. The magnetic recording and reproducing device of claim 18, wherein the driver is installed between the at least two reel tables.

20. The magnetic recording and reproducing device of claim 18, wherein the power changing unit operates together with the driver and selectively transmitting the power to one of the at least two reel tables according to a direction along which the driver rotates.

21. The magnetic recording and reproducing device of claim 9, wherein the reel table is configured to accommodate a reel of a tape cassette thereon.

* * * * *